(12) United States Patent
Shead et al.

(10) Patent No.: US 11,105,236 B2
(45) Date of Patent: Aug. 31, 2021

(54) SELECTIVE CATALYTIC REDUCTION SYSTEM

(71) Applicant: Perkins Engines Company Limited, Peterborough (GB)

(72) Inventors: Leo Shead, Stamford (GB); Alexis Eden, Thrapston (GB); Ronald Silver, Peoria, IL (US)

(73) Assignee: Perkins Engine Company Limited, Peterborough (GB)

( * ) Notice: Subject to any disclaimer, the term of this patent is extended or adjusted under 35 U.S.C. 154(b) by 0 days.

(21) Appl. No.: 16/463,612

(22) PCT Filed: Dec. 11, 2017

(86) PCT No.: PCT/EP2017/082173
§ 371 (c)(1),
(2) Date: May 23, 2019

(87) PCT Pub. No.: WO2018/114419
PCT Pub. Date: Jun. 28, 2018

(65) Prior Publication Data
US 2019/0316503 A1    Oct. 17, 2019

(30) Foreign Application Priority Data

Dec. 21, 2016   (EP) .................................. 16205947

(51) Int. Cl.
*F01N 3/035*   (2006.01)
*F01N 13/00*   (2010.01)
(Continued)

(52) U.S. Cl.
CPC ............. *F01N 3/035* (2013.01); *F01N 3/106* (2013.01); *F01N 3/208* (2013.01); *F01N 11/002* (2013.01);
(Continued)

(58) Field of Classification Search
CPC .. F01N 3/035; F01N 13/0093; F01N 13/0097; F01N 3/106; F01N 3/208;
(Continued)

(56) References Cited

U.S. PATENT DOCUMENTS 5,849,593 A     12/1998   Schmelz
2006/0257303 A1  11/2006   Telford
(Continued)

FOREIGN PATENT DOCUMENTS

EP      2381077 A1    10/2011
EP      3103978 A1    12/2016
(Continued)

OTHER PUBLICATIONS

European Examination Report related to Application No. 16205947.1; dated May 14, 2020.
(Continued)

*Primary Examiner* — Audrey K Bradley
*Assistant Examiner* — Edward Bushard (57) ABSTRACT

A method of treating exhaust gas in an exhaust passage using a selective catalytic reduction system is provided. The system comprises a hydrolysis catalyst in the passage upstream of a SCR catalyst, and a diesel exhaust fluid (DEF) dosing unit for injecting DEF onto the hydrolysis catalyst at a variable DEF dosing rate. The method comprises the steps of predicting an initial DEF dosing rate for converting all nitrogen oxide (NOx) contained in the exhaust gas, and estimating an amount of ammonia stored on the SCR catalyst. The method further comprises the steps of measuring a NOx conversion rate for the system, and adjusting the initial DEF dosing rate based upon the ammonia storage estimate and the measured NOx conversion rate to produce a first adjusted DEF dosing rate. An amount of ammonia-equivalent stored on the hydrolysis catalyst is then esti-
(Continued)

mated, and the first adjusted DEF dosing rate is adjusted based upon the ammonia-equivalent storage estimate to produce a second adjusted DEF dosing rate. DEF is then injected at the second adjusted DEF dosing rate.

11 Claims, 4 Drawing Sheets (51) Int. Cl.
*F01N 3/10* (2006.01)
*F01N 3/20* (2006.01)
*F01N 11/00* (2006.01)

(52) U.S. Cl.
CPC ..... *F01N 13/0093* (2014.06); *F01N 13/0097* (2014.06); *F01N 2240/40* (2013.01); *F01N 2560/026* (2013.01); *F01N 2610/02* (2013.01); *F01N 2610/146* (2013.01); *F01N 2900/0408* (2013.01); *F01N 2900/0412* (2013.01); *F01N 2900/1402* (2013.01); *F01N 2900/1621* (2013.01); *F01N 2900/1622* (2013.01)

(58) Field of Classification Search
CPC ............... F01N 11/002; F01N 2240/40; F01N 2560/026; F01N 2610/02; F01N 2610/146; F01N 2900/0408; F01N 2900/0412; F01N 2900/1402; F01N 2900/1621; F01N 2900/1622; F01N 2610/14; F01N 2610/1453; F01N 13/009; F01N 9/00; F01N 3/2066; Y02T 10/47; Y02T 10/24; Y02A 50/2325
See application file for complete search history.

(56) References Cited

U.S. PATENT DOCUMENTS

| | | |
|---|---|---|
| 2008/0307967 A1 | 12/2008 | Coates et al. |
| 2009/0100825 A1 | 4/2009 | Hiranuma et al. |
| 2010/0024393 A1 | 2/2010 | Chi et al. |
| 2010/0199642 A1 | 8/2010 | Koide et al. |
| 2011/0099977 A1 | 5/2011 | Takahashi |
| 2011/0162350 A1 | 7/2011 | Ponnathpur |
| 2011/0265461 A1* | 11/2011 | Shibata .................. F01N 11/00 60/287 |
| 2017/0175605 A1* | 6/2017 | Hagimoto .......... B01D 53/9418 |

FOREIGN PATENT DOCUMENTS

| | | |
|---|---|---|
| JP | 2003293739 A | 10/2003 |
| JP | 2010223178 A | 10/2010 |

OTHER PUBLICATIONS

International Search Report for Application No. PCT/EP2017/082173; dated Dec. 11, 2017.

* cited by examiner

SELECTIVE CATALYTIC REDUCTION SYSTEM

CROSS-REFERENCE TO RELATED APPLICATION

This Application is a 35 USC § 371 US National Stage filing of International Application No. PCT/EP2017/082173 filed on Dec. 11, 2017 which claims priority under the Paris Convention to European Patent Application No. 16205947.1 filed Dec. 21, 2016.

FIELD OF INVENTION

This invention relates to selective catalytic reduction systems for treating diesel engine exhaust gases.

BACKGROUND OF INVENTION

Selective catalytic reduction (SCR) systems are known and are generally included in the exhaust systems of diesel engines in order to treat the exhaust gases of such engines. Such systems involve the introduction of diesel exhaust fluid (DEF) into exhaust gas flowing in an exhaust passage of an engine. The DEF contains urea which undergoes a hydrolysis and/or thermolysis within the exhaust passage whereby ammonia is produced. The ammonia passes into a SCR catalyst where it reacts with the exhaust gas, wherein any nitrogen oxides (NOx) present in the exhaust gas are converted to nitrogen and water before passing out of the exhaust into the atmosphere.

A number of SCR systems which dose DEF into the exhaust passage have been proposed. Such systems are sometimes referred to as "wet spray" systems and inject a spray of aqueous urea into the exhaust gas where it decomposes to form ammonia. An example of such a system is shown in US2008307967A1. US'967 discloses an arrangement in which DEF is hydrolysed in a supply passage which is outside of a main exhaust passage. Specifically, DEF is dosed onto a hydrolysis catalyst and hydrolysed to ammonia. The ammonia flows downstream to an inlet of a SCR catalyst where it acts to reduce NOx. Generally, a known control process followed by a SCR system such as the one disclosed in US'967 involves dosing the hydrolysis reactor with DEF when ammonia is required to reduce NOx.

When dosing DEF onto a hydrolysis catalyst in a SCR system under certain conditions the DEF cools the catalyst sufficiently to either slow down or effectively prevent thermolysis of urea and subsequent hydrolysis of isocyanic acid, and desorption of ammonia and the isocyanic acid. This suppression of ammonia release creates a lag or delay in the function of the hydrolysis catalyst. This limits the amount of control which can be exerted over ammonia storage in the SCR catalyst, and NOx conversion. Furthermore, the slowed or prevented thermolysis of urea can also lead to urea deposits forming in the exhaust passage, and unreacted urea or ammonia passing untreated out of the exhaust passage in an ammonia slip event if, for example, an exhaust inlet temperature rise occurs.

It is an object of the present invention to obviate or mitigate at least one of the aforementioned disadvantages with known SCR exhaust systems.

SUMMARY OF INVENTION

According to a first aspect of the invention there is provided a method of treating exhaust gas in an exhaust passage using a selective catalytic reduction system. The system comprises a hydrolysis catalyst in the passage upstream of a SCR catalyst, and a diesel exhaust fluid (DEF) dosing unit for injecting DEF onto the hydrolysis catalyst at a variable DEF dosing rate. The method comprises the steps of predicting an initial DEF dosing rate for converting all nitrogen oxide (NOx) contained in the exhaust gas, and estimating an amount of ammonia stored on the SCR catalyst. A NOx conversion rate for the system is then measured. The initial DEF dosing rate is then adjusted based upon the ammonia storage estimate and the measured NOx conversion rate to produce a first adjusted DEF dosing rate. An amount of ammonia-equivalent stored on the hydrolysis catalyst is then estimated. The first adjusted DEF dosing rate is then adjusted based upon the ammonia-equivalent storage estimate to produce a second adjusted DEF dosing rate. DEF is then injected at the second adjusted DEF dosing rate.

According to a second aspect of the invention there is provided a selective catalytic reduction (SCR) system for treating exhaust gas in an exhaust passage. The SCR system comprises a hydrolysis catalyst located in the exhaust passage, a diesel exhaust fluid (DEF) dosing unit for injecting DEF onto the hydrolysis catalyst, and a SCR catalyst located in the passage downstream of the hydrolysis catalyst. An inlet temperature sensor and a first nitrogen oxide (NOx) sensor are each located in the passage upstream of the hydrolysis catalyst. A second NOx sensor is located downstream of the SCR catalyst. A control module is in communication with the inlet temperature sensor, the first and second NOx sensors and the DEF dosing unit, and the control module also reads an ammonia-NOx ratio (ANR) map. The control module controls the DEF dosing rate based upon signals received from the sensors and ANR information obtained from the ANR map.

According to a third aspect of the invention there is provided an exhaust apparatus for a vehicle, the apparatus including a SCR system in accordance with the second aspect of the invention.

According to a fourth aspect of the invention there is provided a vehicle including a SCR system in accordance with the second aspect of the invention.

BRIEF DESCRIPTION OF THE DRAWINGS

Preferred embodiments of the present invention will now be described, by way of example only, with reference to the accompanying drawings, in which.

DETAILED DESCRIPTION OF THE DRAWINGS

Figure 1:
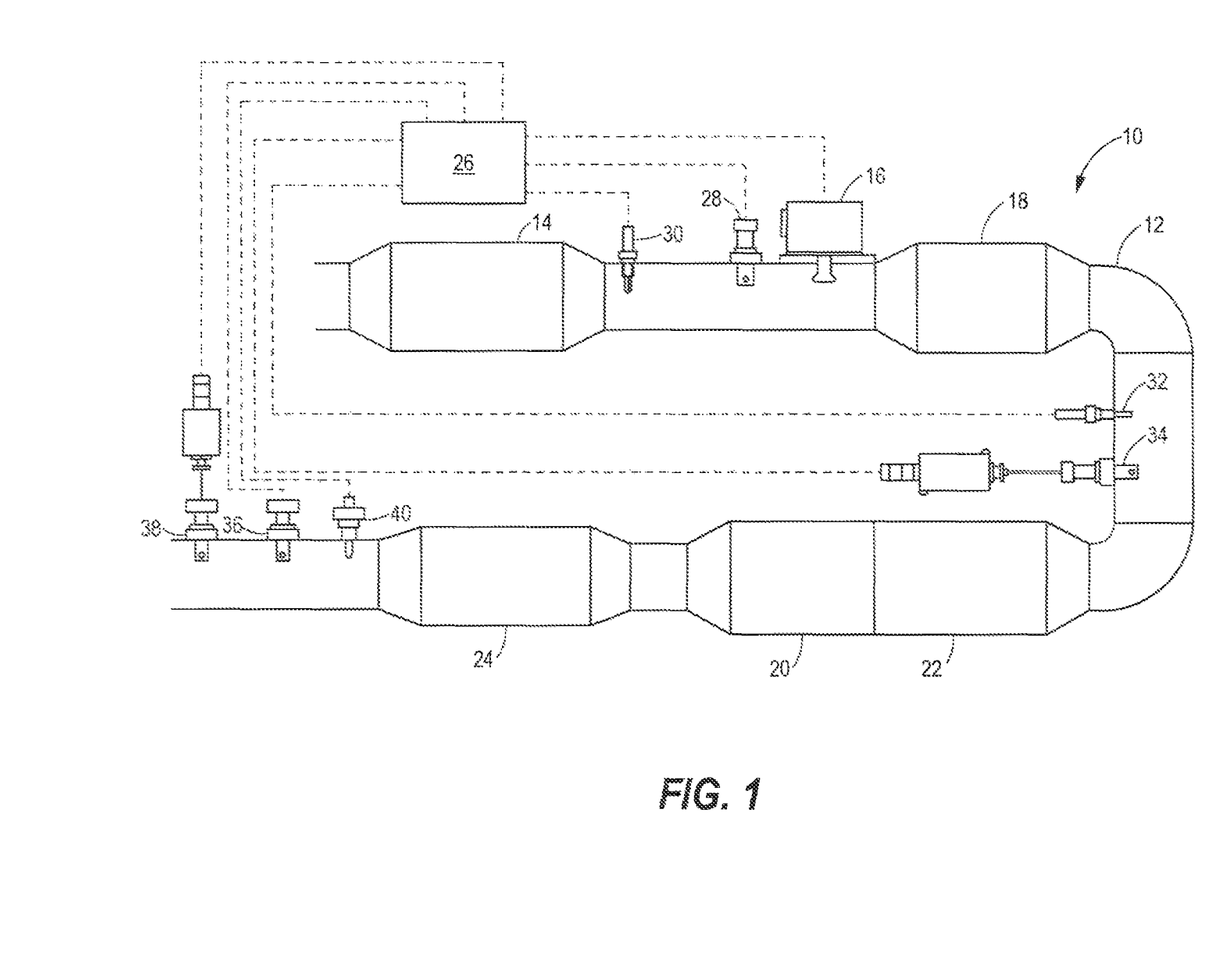
FIG. 1 is a schematic diagram of a selective catalytic reduction (SCR) system.

With reference to FIG. 1, there is shown a selective catalytic reduction (SCR) system 10. The system 10 is located in an exhaust passage 12 which conveys exhaust gas away from an engine (not shown) of a vehicle (not shown).

The exhaust gas first passes through a diesel oxidation catalyst (DOC) 14 of a known type, which may optionally form part of the system 10. The DOC 14 catalyses an oxidation reaction of hydrocarbons and carbon monoxide in the exhaust gas to produce carbon dioxide and water, and also oxidises nitric oxide to nitrogen dioxide.

Located downstream of the DOC 14 is a diesel exhaust fluid (DEF) dosing unit 16 which is configured to inject DEF onto a hydrolysis catalyst 18 located downstream of the DOC 14 in the exhaust passage 12. The DEF dosing unit 16 is of a known type, and injects DEF in the form of an aqueous urea solution. The hydrolysis catalyst 18 is of a known type and catalyses a hydrolysis reaction of the DEF in which ammonia and carbon dioxide are produced.

Located downstream of the hydrolysis catalyst 18 in the exhaust passage 12 is a SCR catalyst 20, which is also of a known type. The SCR catalyst 20 catalyses a reduction reaction between nitrogen oxide (NOx) in the exhaust gas and the ammonia produced upstream in which the NOx is converted into nitrogen and water. The system 10 may optionally include a SCR catalyst filter 22 which is located immediately upstream of the SCR catalyst 20. The SCR catalyst filter 22 is configured to prevent larger particles in the exhaust passage entering the SCR catalyst 20.

Located downstream of the SCR catalyst 20 in the exhaust passage 12 is an optional ammonia slip (AS) catalyst 24 of a known type which is configured to oxidise any unreacted ammonia which has passed through the SCR catalyst 20 before it can pass out of the exhaust into an atmosphere.

The system 10 also includes an electronic control module (ECM) 26 which is in communication with the DEF dosing unit 16 and is configured to control a rate at which the DEF dosing unit 16 injects DEF onto the hydrolysis catalyst 18. The system 10 also includes a plurality of sensors which are in communication with the ECM 26.

An inlet nitrogen oxide (NOx) sensor 28 is located upstream of the hydrolysis catalyst 18 and is configured to measure NOx levels in the exhaust passage 12. The first NOx sensor 28 is in communication with the ECM 26.

Also located upstream of the hydrolysis catalyst 18 is an inlet temperature sensor 30 that is in communication with the ECM 26. The inlet temperature sensor 30 is configured to measure an exhaust gas temperature upstream of the hydrolysis catalyst 18 and to communicate that temperature to the ECM 26.

Located between the hydrolysis catalyst 18 and the SCR catalyst 20 is a hydrolysis catalyst temperature sensor 32 that is in communication with the ECM 26 and configured to measure a SCR temperature value of the exhaust gas upstream of the SCR catalyst 20 and to indicate to the ECM the SCR temperature value by sending a signal to the ECM 26. Also located between the hydrolysis catalyst 18 and the SCR catalyst 20 is a hydrolysis catalyst ammonia sensor 34 that is in communication with the ECM 26.

The system also includes a second NOx sensor 36 located downstream of the AS catalyst 24, which is configured to measure NOx levels in the tailpipe of the exhaust downstream of the SCR system and communicate those NOx levels to the ECM 26. Outlet ammonia and temperature sensors 38,40 may also be located in the exhaust passage adjacent the second NOx sensor 36 In order to measure tailpipe ammonia and temperature levels, respectively, and to communicate those tailpipe ammonia and temperature levels to the ECM 26.

INDUSTRIAL APPLICABILITY

With particular reference to FIGS. 2-5, an example of how the system 10 may be used to treat exhaust gas will now be described.

Figure 2:
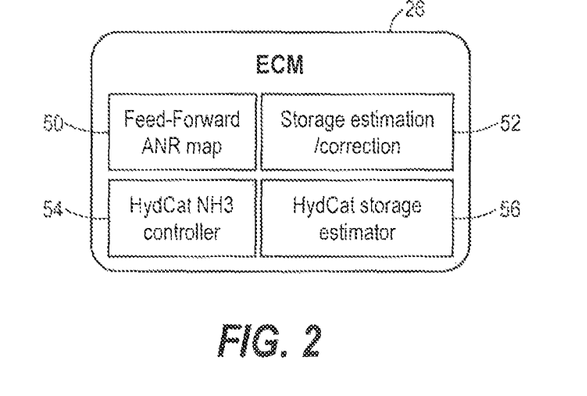
FIGS. 2 and 3 show a main controller and a sub-controller, respectively, used by the ECM of the SCR system shown in FIG. 1.

FIG. 2 shows a main, or standard SCR, controller and a hydrolysis catalyst sub-controller used by the ECM 26. The main controller 100 includes a feed-forward ANR map 50 and a SCR catalyst storage estimator/corrector 52 which estimates ammonia storage and applies the storage estimates and temperature readings in a model/estimator so as to provide feedback correction. In use, the ECM 26 takes NOx readings from the first NOx sensor 28 and temperature readings from the inlet temperature sensor 30, and also calculates a mass flow rate for the exhaust gas in the passage in a known manner. These inlet NOx, temperature and mass flow values are then run through the ANR map 50 in order to predict an initial DEF dosing rate which would convert all NOx in the exhaust gas to nitrogen and water. The main controller 100 also takes readings from the first NOx sensor 28, the second NOx sensor 36 and the hydrolysis catalyst temperature sensor 32 and applies those readings in the SCR catalyst storage estimator/corrector 52. The main controller 100 may also optionally take a reading from the outlet ammonia sensor 38 and apply that ammonia reading as well in the storage estimator/corrector 52. By applying these readings in the storage estimator/corrector 52 the main controller 100 can estimate an amount of ammonia stored on the SCR catalyst 20 and also measure a NOx conversion rate for the overall system 10. Consequently, the main controller 100 can adjust the initial DEF dosing rate obtained from the ANR map 50 based on the ammonia storage estimate and NOx conversion rate in order to produce a first adjusted DEF dosing rate.

Due to the presence of the hydrolysis catalyst 18 in the SCR system 10 the DEF dosing rate has to be further adjusted to take into account an amount of ammonia-equivalent stored on the hydrolysis catalyst. "Ammonia-equivalent" in the context of this disclosure refers to the substances left on the hydrolysis catalyst at any stage during the injection of the DEF and the resultant thermolysis and hydrolysis taking place thereafter. Thus, "ammonia-equivalent" refers to any of DEF, urea, isocyanic acid and ammonia. This additional adjustment is undertaken by way of the sub-controller 102.

The sub-controller 102 contains an operating regime state machine 104, a hydrolysis catalyst storage estimator model 106, an ammonia feed forward/feedback controller 108, and an ammonia-equivalent storage controller 110. The operating regime state machine 104 receives information relating to the first adjusted DEF dosing rate, the mass flow rate of the exhaust, and the inlet temperature measured by the inlet temperature sensor 30. As will be explained below in reference to FIG. 3, the state machine 104 uses that information in order to analyse the inlet conditions of the system and whether it is appropriate to operate in a stable or unstable regime. Information from the state machine 104 can be fed to the ammonia-equivalent storage controller 110, and the sub-controller 102 can therefore determine whether an adjustment to the DEF dosing rate is appropriate. The information from the state machine 104 may also be fed back to the storage estimator/corrector 52 of the main controller 100.

The hydrolysis catalyst storage estimator model 106 receives information relating to the first adjusted DEF dosing rate, the mass flow rate of the exhaust, the inlet temperature measured by the inlet temperature sensor 30, ammonia levels measured by the hydrolysis catalyst ammonia sensor 34, and hydrolysis catalyst temperature as measured by the hydrolysis catalyst temperature sensor 32. The model 106 can then estimate ammonia-equivalent storage in the hydrolysis catalyst 18 and feeds that information forward to the ammonia-equivalent storage controller 110.

The ammonia feed forward/feedback controller 108 also receives the information relating to the first adjusted DEF dosing rate, as well as ammonia levels as measured by the hydrolysis catalyst ammonia sensor 34. The controller 108 uses this information in order to determine whether a further adjustment is required to the first adjusted DEF dosing rate, as will be described below in more detail with reference to FIG. 4.

Thus, the sub-controller 102 is able to estimate an amount of ammonia-equivalent stored on the hydrolysis catalyst 18, and the first adjusted DEF dosing rate is then adjusted again based upon that ammonia-equivalent storage estimate in order to produce a second adjusted DEF dosing rate, if necessary. The DEF is then injected by the DEF dosing unit 16 at that second adjusted DEF dosing rate.

Figure 3:
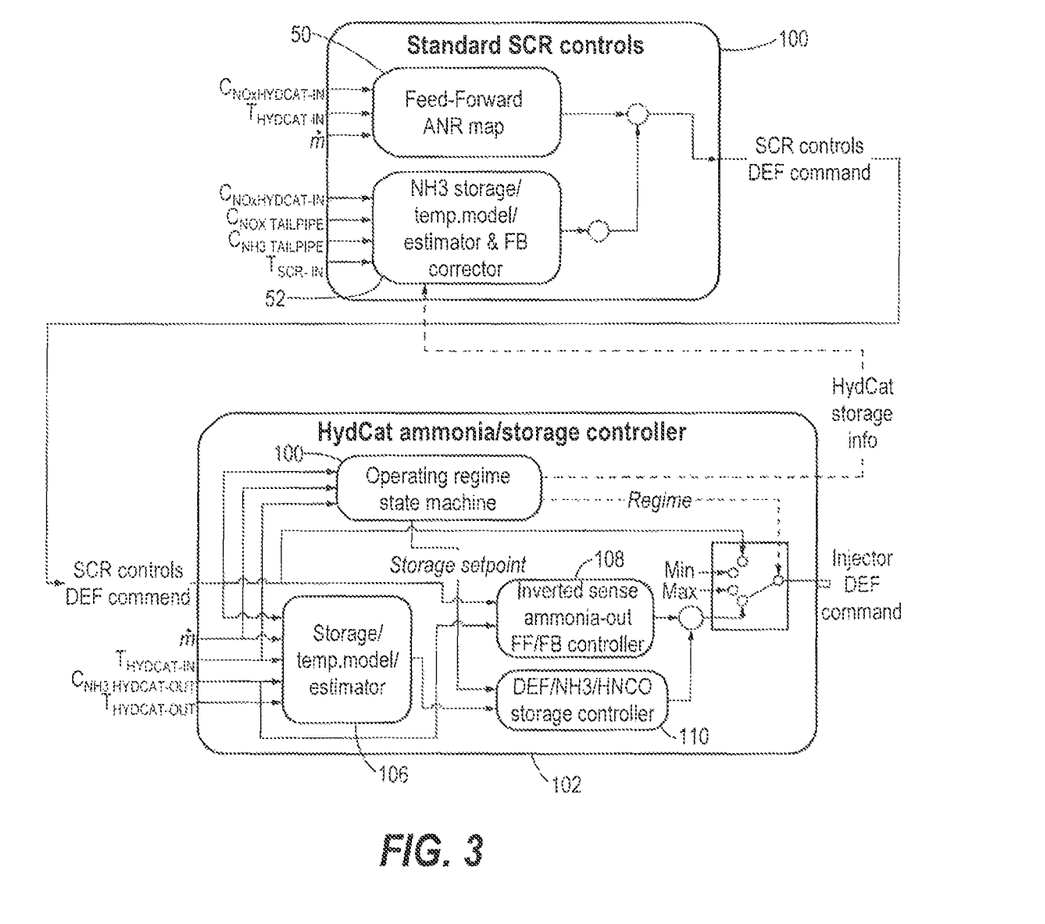

FIG. 3 is a flow diagram illustrating the process steps which may be taken by the sub-controller 102 to analyse the inlet conditions of the system and whether it is appropriate to operate in a stable or unstable regime, and thus whether additional adjustment to the first adjusted DEF dosing rate is desirable. Following commencement step 200, the state machine 104 analyses the inlet conditions at step 202. As explained above with reference to FIG. 3, those inlet conditions comprise the mass flow rate of the exhaust gas as well as the inlet temperature. At decision step 204, the machine determines whether those inlet conditions favour operating the system in an unstable regime. If the inlet conditions favour operating in a stable regime the determination step 206 uses the hydrolysis catalyst storage estimator model 106 to determine the state of the hydrolysis catalyst. Then at decision step 208 the process looks at whether the estimate information from the estimator model 106 indicates an unstable regime. If that information does indicate an unstable regime, the sub-controller 102 adjusts the first adjusted DEF dosing rate to a minimum or managed low-level dosing rate at step 210 until conditions dictate otherwise. If the information from the estimator model 106 indicates a stable regime then the sub-controller 102 will pass the first adjusted DEF dosing rate to the DEF dosing unit 16 at step 212.

If the analysis at decision step 204 determines that the inlet conditions favour operating in an unstable regime the determination step 214 uses the hydrolysis catalyst storage estimator model 106 to determine the state of the hydrolysis catalyst. Then at decision step 216 the process looks at whether the estimate information from the estimator model 106 indicates an unstable regime. If that information indicates a stable regime, the sub-controller 102 adjusts the first adjusted DEF dosing rate to a maximum or managed high-level dosing rate at step 218 until conditions dictate otherwise. If the information from the estimator model 106 indicates an unstable regime then at step 220 the sub-controller 102 will calculate an output from the ammonia feed forward/feedback controller 108 with storage correction from the ammonia-equivalent storage controller 110. This calculation is performed via the sub-routine shown in FIG. 4.

Figure 4:
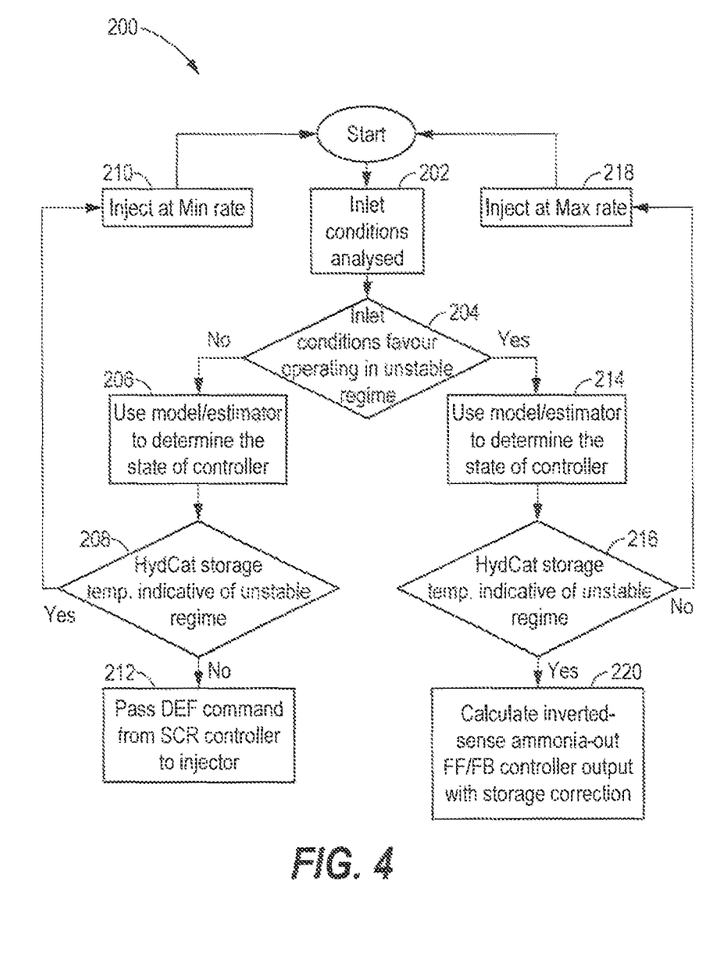
FIG. 4 is a flow diagram illustrating the control process steps taken by an operating regime state machine forming part of the sub-controller shown in FIG. 3.

The ammonia feed forward/feedback calculation and storage correction sub-routine begins with start step 300 and leads to decision step 302 in which it is determined whether the estimated ammonia-equivalent storage on the hydrolysis catalyst is greater than a pre-defined target value. If the storage estimate is less than the target value the ammonia-equivalent storage controller 110 will increase an ammonia-out target bias at step 304. If the storage estimate is greater than the target value the controller 110 will decrease the ammonia-out target bias at step 306. Ammonia-out target bias data 308 may be stored and read as part of the sub-routine.

Once the sub-routine has determined an adjustment to the target bias it converts the first adjusted DEF dosing rate information received from the main controller 100 into an equivalent ammonia-out target value at step 310. The ammonia target bias determined at step 304 or step 306 is the added to the equivalent ammonia-out target value at step 312 to create a biased ammonia-out target. The ammonia-equivalent storage controller 110 then determines at decision step 314 whether the ammonia concentration at the hydrolysis catalyst 18, as measured by the hydrolysis catalyst ammonia sensor 34, is greater than this biased ammonia-out target calculated at step 312. If the ammonia concentration is less than the biased target value then the sub-routine will decrease a DEF dosing bias at step 316. If the ammonia concentration is greater than the biased target value then the sub-routine will increase the DEF dosing bias at step 318. DEF dosing bias data 320 may be stored and read as part of the sub-routine.

Once the DEF dosing bias has been determined this bias is added to the first adjusted DEF dosing rate, hence resulting in the second adjusted DEF dosing rate.

Figure 5:
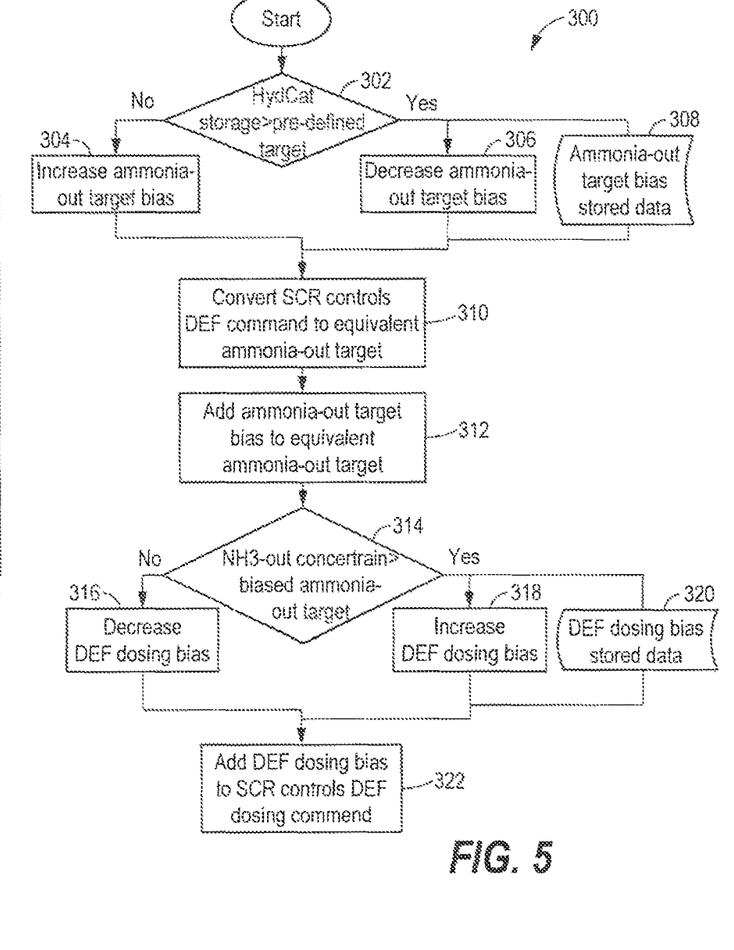
FIG. 5 is a flow diagram illustrating the control process steps taken by an ammonia controller forming part of the sub-controller shown in FIG. 3.
Figure 6:
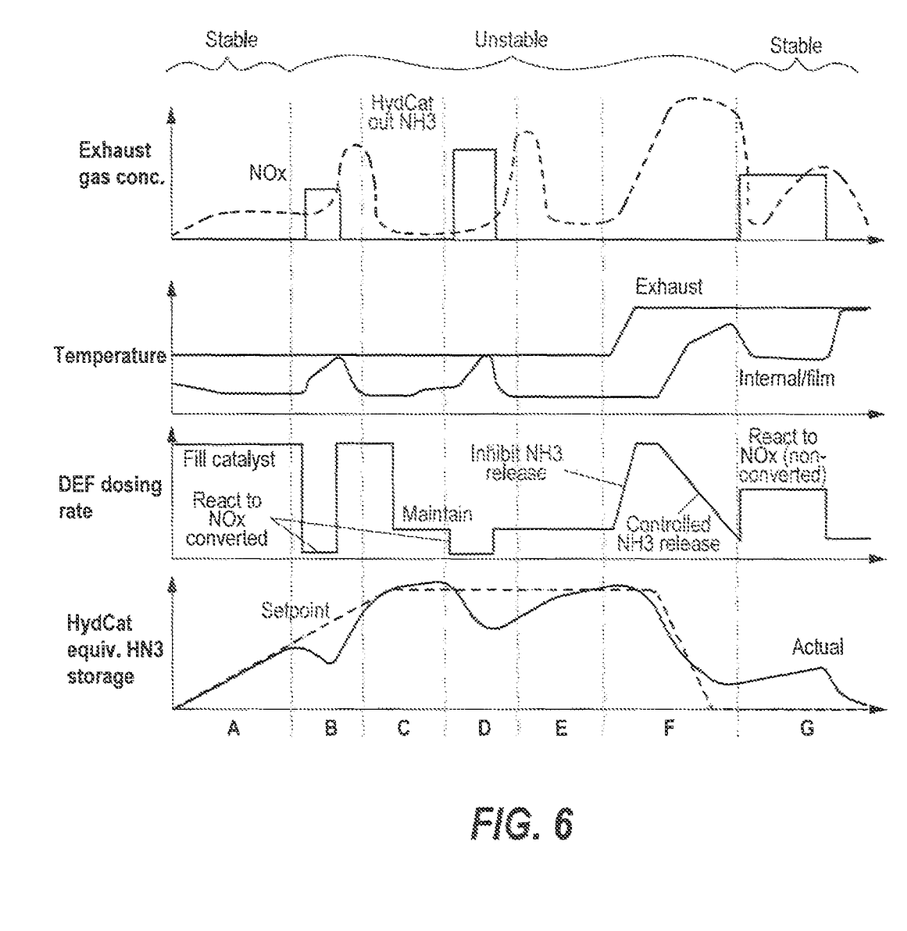
FIG. 6 illustrates an exemplary dosing regime undertaken by the SCR system shown in FIG. 1.

FIG. 5 shows changes in various variables of the system 10 over a time period during an example operating procedure of the SCR system. Those variables are NOx and ammonia concentration in the exhaust gas, exhaust inlet temperature, DEF dosing rate and ammonia-equivalent storage on the hydrolysis catalyst. The time period is divided into phases A-G for ease of explanation. In phase A of the example operating procedure, the state machine 104 determines via the control process shown in FIG. 3 that inlet conditions favour operating in an unstable regime but that the estimate information from the estimator model 106 does not indicate an unstable regime. Consequently the ECM 26 controls the DEF dosing unit 16 such that the DEF dosing unit injects DEF onto the hydrolysis catalyst 18 at the maximum dosing rate, resulting in an increase in ammonia concentration and ammonia-equivalent storage on the hydrolysis catalyst. Exhaust gas temperature in phase A is constant.

In phase B of the example operating procedure the ECM 26 receives a communication from the NOx sensor 28 that NOx has been detected in the exhaust inlet. The state machine 104 has also now determined using the process of FIG. 3 that inlet conditions and estimator model 106 indicate an unstable regime. Thus, the process employs the sub-routine shown in FIG. 4 to calculate an output from the ammonia feed forward/feedback controller 108 with storage correction from the ammonia-equivalent storage controller 110. In this case this results in the ECM 26 instructing the DEF dosing unit 16 to decrease the DEF dosing rate onto the hydrolysis catalyst 18. This results in a spike in ammonia concentration in the exhaust in order for the detected NOx to be treated by the ammonia in the SCR catalyst. The reduction of the DEF dosing rate onto the hydrolysis catalyst also results in a temporary drop in ammonia-equivalent storage on the hydrolysis catalyst, and so the DEF dosing bias is increased.

In phase C of the example operating procedure, the state machine process determines that inlet conditions continue to favour operating in the unstable regime, and the information from the state estimator 106 indicates an unstable regime.

Sub-process step 220 is followed and the ammonia-out target bias is decreased, and this process continues until the target is achieved.

In phase D of the example operating procedure, the ECM 26 again receives a communication from the NOx sensor 28 that NOx has been detected in the exhaust inlet. The state machine 104 has also again determined using the operating regime state process of FIG. 3 that both inlet conditions favour, and the estimator model 106 indicates, an unstable regime. Thus, the process employs the sub-routine shown in FIG. 4 to calculate an output from the ammonia feed forward/feedback controller 108 with storage correction from the ammonia-equivalent storage controller 110. In this case this once again results in the ECM 26 instructing the DEF dosing unit 16 to reduce the ammonia-out target bias onto the hydrolysis catalyst 18. This results in a spike in ammonia concentration in the exhaust as there is no longer any DEF injection to inhibit the release of the ammonia-equivalent substances from the hydrolysis catalyst. The reduction of the DEF dosing onto the hydrolysis catalyst also again results in a temporary drop in ammonia-equivalent storage on the hydrolysis catalyst resulting in the ammonia-out target bias increasing to compensate. In phase E the same process is followed, but the bias changes are small as inlet conditions do not change and the desired ammonia storage target has been achieved.

In phase F of the example operating procedure, the ECM 26 assesses that the exhaust gas temperature has risen. Initially the operating regime state machine decides that conditions favour operating in the unstable regime 204, and the ECM 26 controls the DEF dosing unit 16 such that it increases the rate at which it injects DEF onto the hydrolysis catalyst in a linear manner towards the maximum rate in order to continue inhibiting ammonia release in spite of the increase in exhaust temperature through target bias step 304. The state machine soon assesses that the rise in exhaust gas temperature has lasted too long for ammonia release to be suppressed further. The ECM 26 then controls the DEF dosing unit 16 such that it reduces the rate at which it injects DEF onto the hydrolysis catalyst 18 towards zero as per step 210. This step can be gradual in order to avoid the possibility of post-SCR slip. The exhaust temperature rise causes the ammonia-equivalent storage level on the hydrolysis catalyst 18 to reduce as ammonia and other substances are released.

At final phase G of this example process the ECM 26 then assesses that NOx has again been detected in the exhaust. At this point the operating regime state process is telling the state machine that neither the inlet conditions nor the ammonia-equivalent storage estimate is indicative of an unstable regime. Hence, as shown in FIG. 3, the first adjusted DEF dosing rate determined by the main controller is simply passed directly to the DEF dosing unit 16 such that it injects DEF onto the hydrolysis catalyst 18 at a rate dictated by the NOx levels in a conventional manner. In other words, as the exhaust temperature remains elevated and ammonia-equivalent storage is zero the DEF is injected onto the hydrolysis catalyst 18 when NOx is detected upstream of the hydrolysis catalyst 18 and the DEF dosing rate is proportional to the NOx levels upstream of the hydrolysis catalyst 18

Rather than limiting the DEF dosing to avoid ammonia-equivalent storage, instead the system and method of the present invention maintain a reasonable amount of ammonia-equivalent storage on the catalyst, which is in turn stabilised by the cooling effect of further continued dosing. When ammonia is required to be released, this is achieved by decreasing, instead of increasing, DEF dosing.

In addition, as a high amount of ammonia-equivalent substance is maintained in the system and process of the present invention, when the engine is switched off and the after-treatment system cools, the water component of the DEF will be vaporised leaving urea. This urea can be released on start-up of the engine as an alternative to low temperature dosing.

The control process of the present invention has a counter-intuitive operating mode, whereby dosing is commanded when ammonia is not required at the inlet to the SCR catalyst, and dosing is stopped when ammonia is required. A relatively large amount of ammonia and ammonia-equivalent substances are deliberately stored on the hydrolysis catalyst. Finally, NOx conversion at engine start-up is improved over known systems, with relatively large amounts of ammonia-equivalent substances stored on the hydrolysis catalyst from the previous operation phase of the engine. Modifications and improvements may be incorporated without departing from the scope of the invention, which is defined by the appended claims.

The invention claimed is:

1. A method of treating exhaust gas in an exhaust passage using a selective catalytic reduction system, the system comprising a hydrolysis catalyst in the passage upstream of a SCR catalyst, and a diesel exhaust fluid (DEF) dosing unit for injecting DEF onto the hydrolysis catalyst at a variable DEF dosing rate, and the method comprising the steps of:
    predicting an initial DEF dosing rate for converting all nitrogen oxide (NOx) contained in the exhaust gas;
    estimating an amount of ammonia stored on the SCR catalyst;
    measuring a NOx conversion rate for the system;
    adjusting the initial DEF dosing rate based upon the ammonia storage estimate and the measured NOx conversion rate to produce a first adjusted DEF dosing rate;
    estimating an amount of ammonia-equivalent stored on the hydrolysis catalyst;
    adjusting the first adjusted DEF dosing rate based upon the ammonia-equivalent storage estimate to produce a second adjusted DEF dosing rate; and
    injecting DEF at the second adjusted DEF dosing rate.

2. The method of claim 1, further comprising an initial step of injecting DEF onto the hydrolysis catalyst prior to any NOx being detected in the exhaust passage.

3. The method of claim 2, further comprising the step of increasing the second adjusted DEF dosing rate when the NOx conversion rate increases.

4. The method of claim 2, further comprising the step of decreasing the second adjusted DEF dosing rate when the NOx conversion rate decreases.

5. The method of claim 1, further comprising the step of increasing the second adjusted DEF dosing rate when an increase in exhaust gas temperature is detected at the system inlet.

6. The method of claim 5, further comprising the steps of:
    calculating a duration for the increase in exhaust temperature which would result in an ammonia slip event;
    timing the increase in exhaust gas temperature; and
    gradually decreasing the second adjusted DEF dosing rate if the increase in exhaust gas temperature is sustained over or beyond the calculated duration.

7. A selective catalytic reduction (SCR) system for treating exhaust gas in an exhaust passage, the system comprising:
    a hydrolysis catalyst located in the exhaust passage;
    a diesel exhaust fluid (DEF) dosing unit for injecting DEF onto the hydrolysis catalyst;

a SCR catalyst located in the passage downstream of the hydrolysis catalyst;

an inlet temperature sensor and a first nitrogen oxide (NOx) sensor, each located in the passage upstream of the hydrolysis catalyst;

a second NOx sensor located downstream of the SCR catalyst;

a control module in communication with the inlet temperature sensor, the first and second NOx sensors and the DEF dosing unit; and an ammonia-NOx ratio (ANR) map which is read by the control module;

wherein the control module controls the DEF dosing rate based upon an ammonia storage estimate, an ammonia-equivalent storage estimate, signals received from the sensors and ANR information obtained from the ANR map.

8. The SCR system of claim 7, further comprising an outlet ammonia sensor and/or an outlet temperature sensor located downstream of the SCR catalyst and in communication with the control module.

9. The SCR system of claim 7, further comprising a hydrolysis catalyst temperature sensor and/or a hydrolysis catalyst ammonia sensor, located intermediate the hydrolysis catalyst and SCR catalyst and in communication with the control module.

10. An exhaust apparatus for a vehicle, the apparatus including the SCR system of claim 7.

11. A vehicle including the SCR system of claim 7.

* * * * *